Sept. 15, 1964 V. KINSER 3,148,517
UNIVERSAL JOINT DRIVE MECHANISM
Filed May 8, 1962

INVENTOR.
Vernon Kinser

United States Patent Office 3,148,517
Patented Sept. 15, 1964

3,148,517
UNIVERSAL JOINT DRIVE MECHANISM
Vernon Kinser, 11025 Goethe, Detroit, Mich.
Filed May 8, 1962, Ser. No. 193,194
7 Claims. (Cl. 64—1)

This invention relates generally to an improvement in universal joint drives being used where it is not possible to give complete support to all the members of the drive.

More specifically, my invention relates to the well known form of universal joint drives which usually are employed to effect torque transmission between drive and driven shafts where angular alignment between the shafts for some reason is not possible. But a universal joint running at an angle between two shafts, transmits torque in such a manner as to make it necessary to completely support both shafts. Consequently, if it is desirable to use a universal joint drive where one of the shafts of the drive is not completely supported, provision must be made to compensate for such lack of support.

My present invention has hence for its prime object the provision for a compensating effect within a drive employing universal joints arranged so as to transmit torque at an angle between two shafts where support of one of the shafts is not complete.

And with the above and other objects in view, my invention resides in the novel features of form, construction, arrangement, and combination of parts presently described and pointed out in the claims.

In the accompanying drawings (one sheet)—

Figures 1, 2:
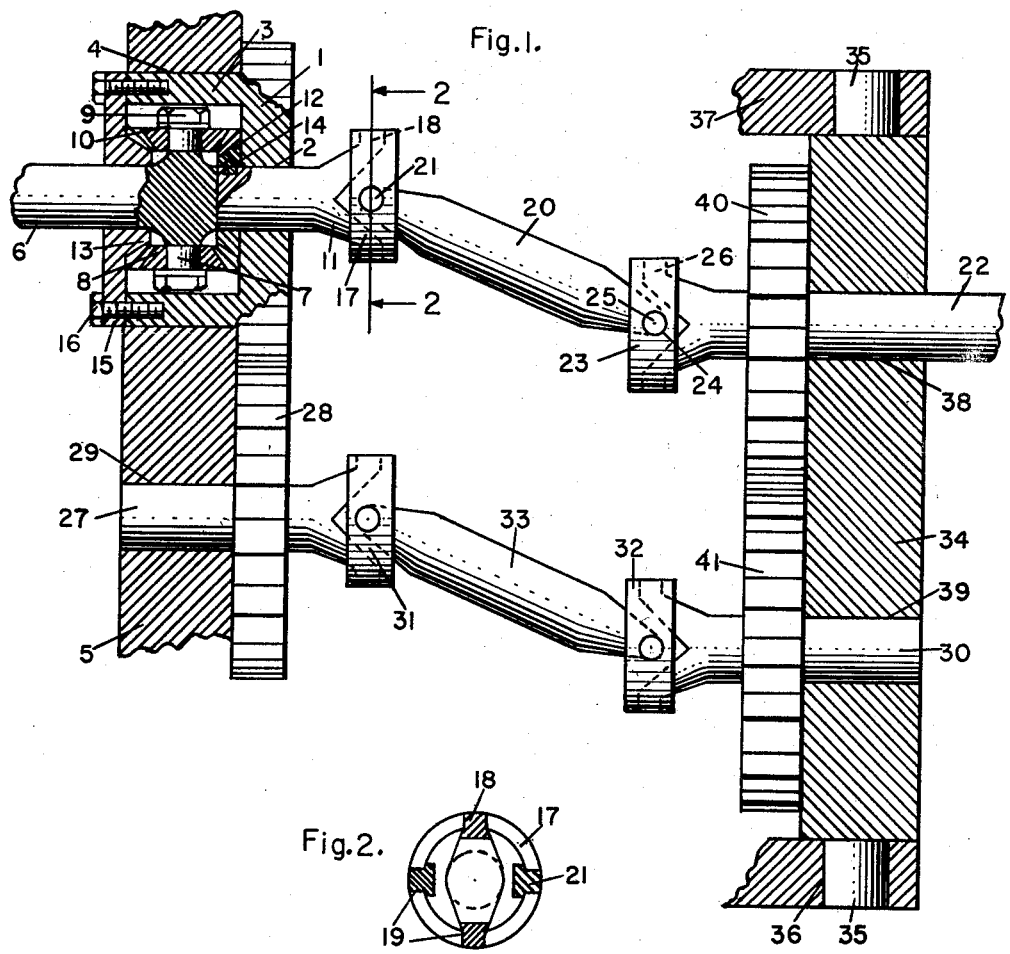
FIGURE 1 is a longitudinal sectional view through a universal joint drive mechanism of my invention.
FIGURE 2 is a sectional view taken approximately on the line 2—2 FIGURE 1.

Referring now more in detail and by reference characters to the drawings, which illustrate practical embodiments of my invention, the gear member 1 is provided with a bore 2 for rotative support of the stub shaft member 11 and an axially extending flange 3 disposed for cooperation with a bore 4 provided in the stationary frame 5 (fragment shown) of some machine tool or other machine whereby to effectively rotatively mount the gear member 1.

Differential means is provided whereby to effectively divide the rotative bias of the drive shaft 6 between the gear member 1 and the stub shaft member 11, for which purpose the drive shaft 6 extends within the inner circumference of the flange 3 and therein is provided with a pair of trunnions 7 upon which is mounted the bevel gears 8 and with suitable lock washers 10 and nuts 9 for planetary movement of the bevel gears 8 in unison with and by the drive shaft 6. Disposed coaxial with respect to the drive shaft 6 and on opposite sides of the bevel gears 8 for meshing engagement therewith is a second pair of bevel gears 12, 13, the bevel gear 12 being mounted for driving engagement with respect to the stub shaft 11 by means of key 14, the bevel gear 13 being mounted for driving engagement with respect to the gear member 1 by means of the flange 15 which is provided as an integral part of the bevel gear 13 and rigidly secured to the gear member 1 by means of suitable fastening elements 16.

Part of the rotative bias of the drive shaft 6, thus, transmitted to the stub shaft 11, in turn, drives the shaft member 20 by means of a universal joint which includes a ring 17 with bores 19 disposed to receive the trunnions 18 provided on the stub shaft member 11 at quadrature with respect to the trunnions 21 provided on the shaft member 20, as best seen in FIGURE 2. In a similar manner the shaft member 20 is connected to the driven shaft 22 by means of a second universal joint, for which purpose the ring 23 is provided with bores 24 for cooperation likewise with trunnions 25, 26 provided on the shaft member 20 and driven shaft 22 respectively.

The other part of the rotative bias of the drive shaft 6 transmitted to the gear member 1 is transmitted in reverse direction to the stub shaft 27 by means of the gear 28 which is in mesh with the gear member 1, the stub shaft 27 being journaled in the bore 29 provided in the stationary frame 5 and connected to a similar stub shaft 30 by means of a second pair of universal joints which would include rings 31, 32 and a shaft member 33 for cooperation therewith, in substantially the same manner stub shaft 11 was connected to the driven shaft 22.

Disposed for partial support of the driven shaft 22 is the member 34 provided with the pair of trunnions 35 for cooperation with the pair of bores 36 located in some stationary or movable member 37 (fragment shown) of a machine; said member 34 being thus pivotally mounted with respect to said member 37. Disposed in the member 34 is the pair of bores 38, 39 for respective journaling of the driven shaft 22 and the stub shaft 30, it may be well to point out that the driven shaft 22 and the stub shaft 30 should be journaled on axes at quadrature with respect to the axis of the trunnions 35 so that the respective gears 40, 41 may be adapted for driving engagement between the driven shaft 22 and the stub shaft 30 with no other effect.

In use and operation, it will be seen that my universal joint drive mechanism effects its purpose. Any rotative bias from the drive shaft 6, thus, divided between the pair of universal joints which connect the stub shaft 11 to the driven shaft 22 and the second pair of universal joints which connect the stub shaft 27 to the stub shaft 30, must fail to react on the axis of the member 34 since the reaction from one pair of universal joints being driven in one direction must counteract that of a second pair of universal joints being driven in reverse direction. Therefore, even though the driven shaft 22 is lacking in support or that is to say not supported against rotation upon the axis of the member 34 the drive shaft 6 may drive directly to the driven shaft 22 as though both shafts were completely supported. It is quite evident from the foregoing that the path of torque transmitted from drive shaft 6 proceeds through cooperating bevel gears 8, 12 thence through stub shaft 11, linking shaft 20 to driven shaft 22 with the direction of rotation of the latter being the same as that of drive shaft 6.

It will be understood that, if desired, the gearing could be changed so that the shafts 20, 33 and cooperating elements would rotate upon same axis, and various other changes and modifications in the form, construction, arrangement and combination of the several parts of the universal joint drive mechanisms may be made and substituted for those herein shown and described without departing from the nature and principles of my invention.

Having thus described my invention, what I claim and desire to secure by Letters Patent is:

1. A drive mechanism comprising a power shaft, a first pair of spaced apart driven shafts, first gear means operatively engaging said power shaft with one of said first pair of driven shafts, a driving gear rotatably mounted on said one of said first pair of driven shafts, second gear means connecting said power shaft with said driving gear, a driven gear meshing with said driving gear and mounted on said other of said first driven shafts, a first universal joint mounted on one end of each of said first driven shafts, a linking shaft engaged at one of its ends to each of said first universal joints, a second universal joint engaged to the other end of each linking shaft, a second pair of spaced apart driven shafts, and each of said second driven shafts being connected to one of said second universal joints.

2. A drive mechanism as defined in claim 1 and further characterized by gear means inter-connecting the first pair of driven shafts.

3. A drive mechanism as defined in claim 1 and further characterized by said first pair of driven shafts being axially parallel, said second pair of driven shafts being axially parallel, and motion transmitting means inter-connecting said second pair of driven shafts.

4. A drive mechanism as defined in claim 1 and further characterized by the longitudinal axes of the linking shafts being at an angle of less than 180 degrees to the longitudinal axes of the related shafts of said first and second driven shafts, said linking shafts being unsupported between the connections to the first and second universal joints.

5. A drive mechanism as defined in claim 1 and further characterized by the axes of said first driven shafts being parallel to the axes of said second driven shafts.

6. A drive mechanism as defined in claim 1 and further characterized by a frame element, a mounting member pivotally disposed on said frame element, said mounting member having a pair of spaced apart bores, said second driven shafts being journaled in said bores, and motion transmitting means interconnecting said second driven shafts proximate their connections to the related second universal joints.

7. A drive mechanism comprising a power shaft, a first driven shaft axially aligned with said power shaft, means operatively connecting said power shaft and said first driven shaft, a first universal joint engaged on the end of said first driven shaft remote from said power shaft, a linking shaft unsupported between its ends being engaged at one of its ends to said first universal joint, a second universal joint engaged to the other end of said linking shaft, a second driven shaft engaged to said second universal joint, the longitudinal axis of said second driven shaft being parallel to the longitudinal axis of said first driven shaft, a frame element comprising a pair of spaced apart members, there being a bore provided in each spaced apart member, a mounting member disposed intermediate said spaced apart members, a trunnion projecting laterally from each side of said mounting member, said trunnions being pivotally disposed within said bores, said mounting member having a bore, and said second driven shaft being journaled in said bore.

References Cited in the file of this patent

UNITED STATES PATENTS

| | | |
|---|---|---|
| 1,234,455 | Fox | July 24, 1917 |
| 2,605,853 | Swenson | Aug. 5, 1952 |
| 2,691,876 | Wildhaber | Oct. 19, 1954 |
| 2,755,765 | Wanzer | July 24, 1956 |
| 2,850,920 | Buckendale | Sept. 9, 1958 |
| 2,895,348 | Beachler | July 21, 1959 |
| 2,991,657 | Schatz | July 11, 1961 |